(12) United States Patent
Kates et al.

(10) Patent No.: US 7,395,248 B2
(45) Date of Patent: Jul. 1, 2008

(54) METHOD FOR DETERMINING COMPETING RISKS

(76) Inventors: Ronald E. Kates, Palnkamer Str. 49, Otterfing (DE) 83624; Nadia Harbeck, Palnkamer Str. 49, Otterfing (DE) 83624

( * ) Notice: Subject to any disclaimer, the term of this patent is extended or adjusted under 35 U.S.C. 154(b) by 280 days.

(21) Appl. No.: 10/433,740

(22) PCT Filed: Dec. 7, 2001

(86) PCT No.: PCT/EP01/14411

§ 371 (c)(1),
(2), (4) Date: Nov. 12, 2003

(87) PCT Pub. No.: WO02/47026

PCT Pub. Date: Jun. 13, 2002

(65) Prior Publication Data

US 2004/0073096 A1    Apr. 15, 2004

(30) Foreign Application Priority Data

Dec. 7, 2000  (DE) ................................. 100 60 928

(51) Int. Cl.
    G06F 15/18   (2006.01)
(52) U.S. Cl. ............................. 706/12; 706/15; 706/25; 706/31
(58) Field of Classification Search .................. 706/12, 706/45
    See application file for complete search history.

(56) References Cited

U.S. PATENT DOCUMENTS

| | | | | |
|---|---|---|---|---|
| 5,565,364 | A * | 10/1996 | Schaefer et al. | 436/43 |
| 5,701,400 | A * | 12/1997 | Amado | 706/45 |
| 5,943,663 | A * | 8/1999 | Mouradian | 706/45 |
| 6,125,105 | A * | 9/2000 | Edwards et al. | 370/230 |
| 6,606,615 | B1 * | 8/2003 | Jennings et al. | 706/45 |
| 6,968,327 | B1 * | 11/2005 | Kates et al. | 706/21 |
| 2004/0122702 | A1 * | 6/2004 | Sabol et al. | 705/2 |
| 2005/0091176 | A1 * | 4/2005 | Nishiuma et al. | 706/45 |

OTHER PUBLICATIONS

"Neural network analysis of follow-up data in primary breast cancer", N. Harbeck, R. Kates, K. Ulm, H. Graeff, M. Schmitt, International Journal of Biological Markers, Jan.-Mar. 2000, pp. 116-122.*
"Neural Networks: A Review from a Statistical Perspective", B. Cheng, D. M. Titterington, Statistical Science, 1994, vol. 9, No. 1, 2-54, pp. 2-30.*

* cited by examiner

*Primary Examiner*—Wilbert Starks
*Assistant Examiner*—Mai T Tran
(74) *Attorney, Agent, or Firm*—IP Strategies (57) ABSTRACT

The invention concerns a method for determining competing risks for objects following an initial event based on previously measured or otherwise objectifiable training data patterns, in which several signals obtained from a learning capable system are combined in an objective function in such a way that said learning capable system is rendered capable of detecting or forecasting the underlying probabilities of each of the said competing risks.

11 Claims, 3 Drawing Sheets

METHOD FOR DETERMINING COMPETING RISKS

FIELD OF THE INVENTION

The invention is directed to a method for determination of competing risks following an initial event using a learning-capable system on the basis of previously measured or otherwise objectifiable data ("training data").

BACKGROUND OF THE INVENTION

Learning-capable systems such as neural nets are being used increasingly for risk assessment, because they are capable of recognizing and representing complex relationships between measured factors and outcomes that are not known a priori. This capability allows them to provide more reliable and/or more precise risk probability estimates than conventional procedures that are forced to assume a special form of the relationship, such as linear dependence.

In the field of medical applications, e.g., in treatment of cancer, the use of learning-capable systems such as neural nets or recursive partitioning (such as the well-known CART, "Classification and Regression Trees", see for example: L Breiman et al., "Classification and Regression Trees", Chapman and Hall, New York (1984)) for assessment of the risk probability of an event is known, even for censored data. (Outcome data is known as "censored" if some events that eventually occur are not necessarily observed due to the finite observation time.) An example of the application of learning-capable systems in cancer is the task of determining, at a point in time just after primary therapy, a patient's risk probability (say, risk of future disease (relapse)), in order to support the therapy decision.

The "factors" of the data sets comprise a set of objective characteristics whose values are not influenced by the person operating the learning capable system. In the case of primary breast cancer, these characteristics may typically comprise Patient age at time of surgery
Number of affected lymph nodes
Laboratory measurement of the factor uPA
Laboratory measurement of the factor PAI-1
Characteristic of tumor size,
Laboratory measurement of the estrogen receptor,
Laboratory measurement of the progesterone receptor.

The form of therapy actually administered can also be coded as a factor in order that the system also recognize relationships between therapy, and outcome.

The values are stored on an appropriate storage medium and are presented to the learning capable system. However, as a rule, individual measurements are subject to uncertainty analogous to the noise in a measured signal. The task of the learning capable system is to process these noisy values into refined signals which provide, within the framework of an appropriate probability representation, risk assessment.

The learning capability of networks even for nonlinear relationships is a consequence of their architecture and functionality. For example, a so-called "multilayer perceptron" (abbreviated "MLP" in the literature) comprises one input layer, one hidden layer, and one output layer. The "hidden nodes" present in a neural net serve the purpose of generating signals for the probability of complex internal processes. Hence, they have the potential to represent and reveal for example underlying aspects of biological processes that are not directly observable, but which nonetheless are ultimately critical for the future course of a disease.

Internal biological processes can proceed in parallel, at different rates, and can also interact Learning capable systems are capable of recognizing and representing even such internal processes that are not directly observable; in such cases, the quality of this recognition manifests itself indirectly, after learning has taken place, by virtue of the quality of the prediction of the events actually observed.

By recursive partitioning (e.g., CART), classification schemes are created that are analogous to the capabilities of neural nets in their representation of complex internal relationships.

The course of a disease may lead to distinct critical events whose prevention might require different therapy approaches. In the case of first relapse in breast cancer, for example, it is possible to classify findings uniquely into the following mutually exclusive categories 1. "distant metastasis in bone tissue"
2. "distant metastasis but no findings in bone"
3. "loco-regional" relapse.

Now, once one of these events has occurred, the subsequent course of the disease, in particular the probability of the remaining categories, can be affected; hence, in a statistical treatment of such data it is often advisable to investigate just first relapses. For illustration, in the case of a breast cancer patient suffering local relapse at 24 months after primary surgery and observed with "bone metastasis" at 48 months, only category 3 is relevant if one restricts to first relapse. The follow-up information on bone metastasis would not be used in this framework, i.e., the patient is regarded as "censored" for category 1 as soon as an event in another "competing" category (here local relapse) has occurred.

Competing risks can also occur for example due to a patient's dying of an entirely different disease or of a side-effect of therapy so that the risk category of interest to the physician is not observed.

For one skilled in the art, it is relatively obvious that by applying an exclusive endpoint classification with a censoring rule for unrealized endpoints, the data can be projected onto a form such that for each possible endpoint, according to the prior art, a separate neural net can be trained or a classification tree can be constructed by recursive partitioning. In the example with outputs 1-3, three completely independent neural networks or three independent decision trees would need to be trained.

A problem with this use of the prior art is that detection of possible predictive value of internal nodes with respect to one of the disease outcomes is lost with respect to the remaining disease outcomes. In reality, however, an internal biological process, detected by internal nodes of a neural network, could contribute to several different outcomes, albeit with different weightings. For example, the biological "invasiveness" of a tumor has a differing but significant impact both on distant metastasis and local relapse. The separately trained nets would each need to "discover" independently the impact of an Internal relationship coded in a node.

It is evident that the number of real events presented to a learning capable system is an important determinant of the detection quality, analogously to the statistical power of a system. This number is usually limited in medical applications. Hence, the probability is relatively high that an internal process will barely exceed the detection threshold with respect to one outcome but not with respect to the others. Under these circumstances, the potential impact to distinguish factor influences, as well as the biological explanatory potential of an internal node even for other outcomes, are lost.

Since therapies often have side effects it is typical for the medical decision context that the reduction of one risk category may occur at the expense of an increase of another risk. For this, the need to train a completely new neural net for each separate risk, as required by the prior art, is unsatisfactory.

The time-varying impact of factors on outcomes can be represented according to the prior art by different nodes in the output layer corresponding to particular time-dependent functions (e.g., by the known method of fractional polynomials). Although a time-varying assessment of the hazard rate is possible according to the prior art, the problem of competing risks cannot be formulated according to the prior art without interfering with a proper assessment of time-varying hazards.

In view of the deficiencies of the prior art, the task of the invention is to provide a method for detecting, identifying, and representing competing risks according to their intrinsic logical and/or causal relationship, in particular in such a manner that determination of a time-varying assessment is not restricted.

DESCRIPTION OF THE INVENTION

This task is solved by the method according to patent claim 1.

The invention provides a method for the learning capable system to assign appropriate distinct characteristic scores to competing risks. These scores are designed to enable the estimation of the conditional probability per unit time for occurrence of the event category in question (under the premise that none of the final outcomes under consideration has yet occurred). In the sense of the invention, "appropriate" characteristic scores have the property that a maximum of the statistical likelihood is sought with respect to all outputs.

It is evident that the method of the invention applies to a broad spectrum of fields, such as engineering, economics, finance, biology, or medicine. In the case of medicine, the objects may refer to patients who, following primary disease the initial event, are at risk for competing forms of disease relapse.

It is advantageous to utilize measurements or other objectively compiled data associated with the initial event together with follow-up observations recorded up to a specified time.

It is of advantage if the time of the most recent follow-up observation is recorded and used in the training data patterns.

The method of the invention can thus be applied within the framework of any trained learning capable system to any objective function analogous to statistical likelihood, provided that sat function can be constructed from the follow-up data.

In an advantageous embodiment of the invention, failure categories are defined such that observation of one failure category implies exclusion of the other categories at time of observation. In this way, the embodiment provides a means preferentially assessing one particular failure category.

It is advantageous to specify the objective function L in terms of a function P of the form:

$$L(\mu; \{x_j, t_j, \delta_{jk}\}) = \prod_{j=1}^{n} P([f_{LS(k,x_j)}(t_j)]; [S_{LS(k,x_j)}(t_j)]; k=1,\ldots,K),$$

Here, the notation $\mu$ denotes collectively the parameters of the learning capable system. ("LS" stands for "learning capable system".) The notation $f_{LS(k,xj)}(t_j)$ denotes the "failure" rate of category k, and $S_{LS(k,xj)}(t_j)$ denotes the expectation value of the fraction of objects j with observed characteristics $x_j$, that have not suffered a failure of category k by time $t_j$. P is determined by an appropriate logical relationship model, where the follow-up data is cod d in the form $\delta_{jk}$, where $\delta_{jk}=1$, if object j is observed at time $t_j$ to suffer a failure of category k, else $\delta_{jk}=0$.

It is advantageous to define the objective function in the form $$L(\mu; \{x_j, t_j, \delta_{jk}\}) = \prod_{j=1}^{n} \prod_{k=1}^{K} [f_{LS(k,x_j)}(t_j)]^{\epsilon_{jk}} [S_{LS(k,x_j)}(t_j)]^{\psi_{jk}}$$

where $\epsilon_{jk}$ and $\psi_{jk}$ are uniquely determined using the logical relationships from $\delta_{jk}$.

It is advantageous to use $$L(\mu; \{x_j, t_j, \delta_{jk}\}) = \prod_{j=1}^{n} \prod_{k=1}^{K} [f_{LS(k,x_j)}(t_j)]^{\delta_{jk}} [S_{LS(k,x_j)}(t_j)]^{1-\delta_{jk}}$$

as the objective function.

In a preferred embodiment, the learning capable system consists of a neural net. In this case, depending on P, the aforementioned objective function L may be expressed in the form $$L(\mu; \{x_j, t_j, \delta_{jk}\}) = \prod_{j=1}^{n} P([f_{NN(k,x_j)}(t_j)]; [S_{NN(k,x_j)}(t_j)]; k=1,\ldots,K).$$

It is advantageous to use a neural network of architecture MLP (multi-layer perceptron).

In another preferred embodiment, the learning capable system carries out recursive partitioning, where
- each object is assigned to a node,
- to each node there is assigned the frequency or probability of all outcome categories, and
- the partitioning is carried out such that the objective function to be optimized takes these frequencies or probabilities into account according to an appropriate statistical model.

In a preferred application, the learning capable system is used in the framework of decision support.

It is advantageous to assign values pertaining to selection of a strategy to the distinct probability functions of the competing risks. In this way, for example in the case of a medical application of the present invention, a therapy strategy may be assessed.

BRIEF DESCRIPTION OF THE DRAWINGS

In what follows, the method of the invention for determining competing risks will be further described with reference to the figures as follows.

DESCRIPTION OF THE INVENTION

Although the embodiments described, in what follows refer to medical applications this reference is not to be construed as a limitation of any kind.

The following description utilizes the terminology of neural nets of architecture MLP. However, the application using other neural net architectures or regression trees is analogous and would be clear without further description to one skilled in the art.

In particular, the invention provides for introduction an additional dimension of the output layer of the leaning capable system, where
- the additional dimension of the output layer comprises at least two nodes
- the nodes of this additional dimension correspond to the different outcome events
- every output node is associated with a unique signal,
- the individual signals are each mapped to a risk function with respect to the possible event categories,
- the signals of the output functions are combined to a total signal
- the learning capable system is trained with reference to an objective function obtained from the total signal constructed from the set of all data exemplars A system trained in this manner supports the responsible physician and the patient for example in deciding to use one of several alternative or mutually exclusive therapy approaches by determining against which of the possible relapse categories therapy should be directed.

Representation of the Problem and Overview

The aim of individualized patient prognosis with competing risks may be formulated mathematically as the problem of approximating At plurality of functions $f_1(x) f_2(x) f_3(x)$, by means of a learning capable system, for example, a neural net $NN_1(x)$, $NN_2(x)$, .... More precisely, the neural net estimates the expectation value $E(Y_k|x)$ of the stochastic variables $y_k$ conditioned on observed characteristics x:

$$NN_k(X) \approx ff_k(x) = E(y_k|x).$$

Figure 1:
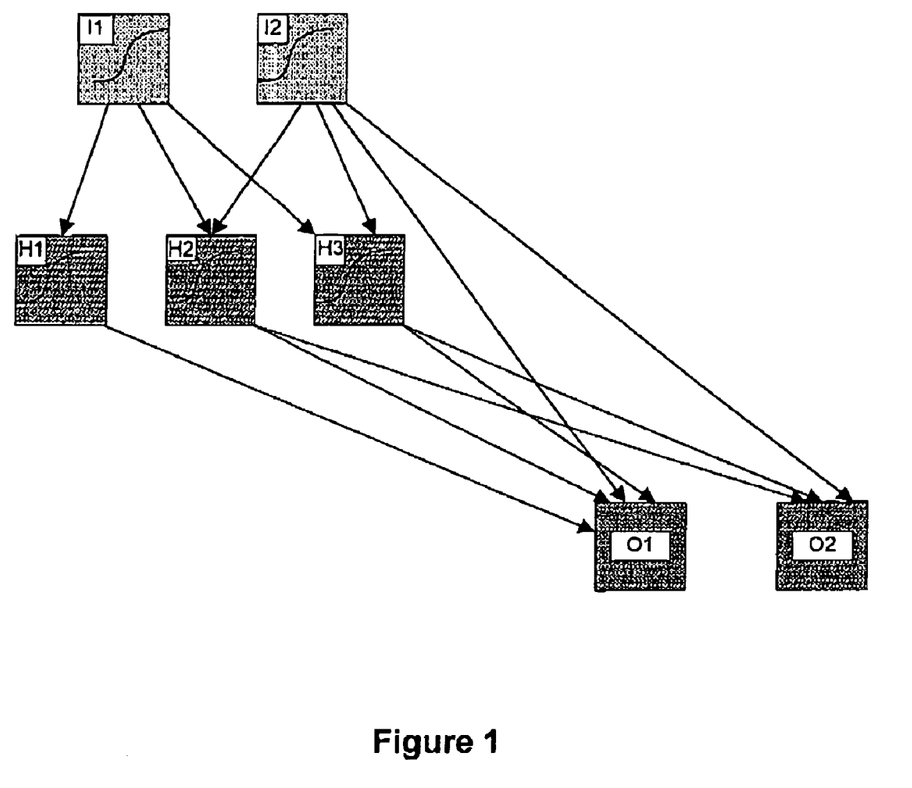
FIG. 1 A representation of a neural network in an implementation as a multi-layer perceptron, FIG. 2 a Venn diagram of competing risks, and FIG. 3 an illustration of a trained neural network with three competing risks.

In a specific embodiment of the invention as a multilayer perceptron considered for the moment, the neural net can be represented schematically as illustrated in FIG. 1.

In this figure, all squares represent neurons. The neurons depicted in the upper part of the figure provide signals consisting of either
- raw patient characteristics (e.g., in primary breast cancer, uPA, PAI-1, number of affected lymph nodes, etc.) or
- quantities obtained by mathematically transforming these characteristics in some way (e.g., adjusted values obtained by subtracting out the mean or median of the distribution and normalizing by the standard deviation of the distribution) or
- derived quantities obtained using prior knowledge or other statistical methods.

Together, these neurons constitute the input layer.

The middle neurons form the internal layer. However, it is also possible in the method of the invention to specify several internal layers. Each internal neuron processes the signals from the neurons that act as inputs to it and transmits a signal to the next layer. The mathematical relationship between "inputs" to the internal neurons and their "outputs" is controlled by convergence of synaptic weights.

The neurons depicted at the bottom give estimates of the desired characteristic quantities of the model (e.g., expectation value of survival) and constitute the output layer.

Suppose that a number m of patients is available to allow the network to learn the relationships $f_1(x) f_2(x) f_3(x)$, ... that have been assumed to exist. To each patient, a data pattern (x,y) is assigned, where for competing risks the output variables y are understood to represent vectors ($y=[y_1 y_2, y_3, ...]$) possibly containing more than one component. The task of the net is thus to learn the underlying dynamics using the set of data patterns $\{(x^1,y^1), ... (x^m, y^m)\}$. The superscript refers to the patient index. In the learning process, a fitting of the synaptic weights takes place.

The architecture used in the embodiment consists of a classical multi-layer feed-forward net. neurons are organized in layers as described above. Connectors exist in the embodiment as follows:
- input layer→hidden layer
- input layer→output layer
- hidden layer→output layer The use of connectors from input layer→output layer is favorable, but not obligatory for the function of the invention, because they are not necessarily required for representation of a mapping NN(x).

Operation of Neural Nets

Neurons as Functions

Each neuron receives a stimulus signal S processes this according to a pre-specified activation function F(S) and outputs a corresponding response signal A=F(S), which is transmitted to all subsequent neurons that are still connected to said neuron. In the embodiment, the activation function of the hidden layer is the hyperbolic tangent. The invention can be operated as well using any other suitable activation function such as the logistic function.

Transformations and Input Neurons

It is favorable to apply an initial univariate transformation to the factors such that their values lie within an interval of order unity, e.g. in the, embodiment $$X_j = \tan h[(x_j - x_{Median})/x_Q] \tag{1.a}$$

is used. This formula implies that first the median $x_{Median}$ of the distribution of x is subtracted, and the values are rescaled by the factor $x_Q$. Values above the median are scaled by the 75%-quartile, while values below the median are scaled by the 25%-quartile. The function tanh is then applied to the result.

The input neurons have a static function and are thus implemented in the embodiment as arrays for transmitting the transformed values to the next layer. Conceptually, the hyperbolic tangent function of Equation 1.a can be regarded as the activation function of the input layer.

Hidden Neurons

The output of hidden node h for patient j is to be determined. To this end, in the embodiment a check is performed as to whether or not the hidden mode h is still active. If it is active, then the input signals are multiplied by the corresponding weights to construct the sum $W_h \cdot x_j$. More precisely, the signal to hidden node h for pattern j is a weighted sum of inputs of the form $$z_h(j) = \sum_i w_{ih} X_i(j),$$

where $w_{ih}$ represents the weight of the connector from input neuron i to hidden neuron h, and $X_j(j)$ represents the (scaled) response of the i-th input neuron. The response of the hidden neuron h is $$Y_h(j) = F_h(z_h(j) - b_h) \tag{2.a}$$

Here, $b_h$ is the bias of hidden neuron h, which from a computational algorithmic point of view is optimized just like any other weight of the network. In the embodiment the nonlinear activation function $F_h$ is the hyperbolic tangent function.

Output Nodes

The output of output node o for patient j is to be determined. To this end, in the embodiment a check is performed as to whether or not the output node o is still active. Connectors to output nodes may be present either from the hidden layer or from the input layer. For each connector that is still active, the appropriate input signals are multiplied by the corresponding weights.

The signal $z_o$ is first constructed: The bias of neuron $b_o$ is subtracted out, and the activation function of the output neuron o is applied to this result. The output $O_o$ (j) thus becomes $$z_o(j) = \sum_i w_{io}(X_i(j) - c_i) + \sum_h w_{ho} Y_h(j) \quad (2.b)$$
$$O_o(j) = F_o(z_o(j) - b_o)$$

The activation function of the output layer is taken as the identity in the embodiment.

In the embodiment, the total bias does not vary freely, but rather, in contrast to the hidden layer, the total bias is constrained such that the median signal of all output neurons vanishes. This procedure does not restrict the generality of the model in any way. It has the advantage of reducing the number of parameters to be optimized by the number of bias parameters.

Survival Analysis for Competing and Time-Varying Risks in the Context of Learning Capable Models Relationship to a Learning Capable System Suppose that we are given a patient collective with available covariates (prognostic factors) $x_j$, which were measured at an initial time, denoted t=0 (e.g., at the time of primary surgery), as well as endpoints in time denoted $t_j$. One defines $\delta_{jk}=1$ (k=1,2,3, . . . ) if a known failure of category k is recorded for the j-th patient at time $t_j$. If the patient is censored at the endpoint (no failure, further course unknown) one defines $\delta_{jk}=0$.

Let $S_k(t)$ be the expectation value of the proportion of patients having suffered no failure of category k by time t, where $S_k(\infty)=0$ and $S_k(0)=1$. For each k, it is useful to define a failure rate $f_k(t)$ and a "hazard function" $\lambda_k(t)$ by $$f_k(t) \equiv -\frac{dS_k}{dt} \quad (3.a)$$
$$\lambda_k(t) \equiv -\frac{f_k(t)}{S_k(t)}$$

so that $$\lambda_k(t) = -\frac{d}{dt}[\log S_k(t)] \quad (3.b)$$

holds.

The interpretation of these individual hazard rates is as follows: If it were possible to avoid failures of all other categories by a means having no effect on the failure category k in question, then $f_k(t)$ would approximate the observed failure rate for category k. Now, in a real situation, $f_k(t)$ will not be observed as the failure rate. However, for use of the invention within a decision support system, failure rate estimates $f_k(t)$ for all categories are needed in order to determine the impact of a reduction of one failure rate on the overall well-being of the patient.

For a known form of the hazard function $\lambda_k(t)$, one obtains the $S_k(t)$ by integration of Eq. (3.b) with the initial condition $S_k(0)=1$.

At a time t after primary surgery for a patient with covariates x, we obtain from the neural net the hazard function $\lambda_k(t|x)$, which now depends on covariates x. We express the hazard function model for given covariates x in the form $$\lambda_k(t|x) = \lambda_{k0}(t) h_k(t|x) \quad (4)$$

with $$h_k(t \mid x) = \exp\left[\sum_{l=1}^{L} B_l(t) NN_{kl}(x)\right] \quad (5.)$$

The functions $B_i(t)$ are chosen to be suitable for the particular problem. One alternative is to use spline functions. In the embodiment, fractional polynomials, i.e., $B_i(t)=t^{(i-1)/2}$, are preferred for $B_i(t)$.

One thus obtains $$\lambda_{0k} \exp\left[\sum_l NN_{kl}(x) B_l(t)\right] = -\frac{d}{dt} \log(S_k(t)). \quad (6.)$$

In this equation, the k are considered to be constant. The time dependence resides in the coefficients $B_i(t)$. This model is a proportional hazards model if $B_1=1$ and all remaining $B_i$ vanish. Deviations from proportional hazards can be modeled by including terms $B_i$ with l>1.

In a broad class of applications, an objective function of the form $$L(\mu; \{x_j, t_j, \delta_{jk}\}) = \prod_{j=1}^{n} P([f_{NN(k,x_j)}(t_j)][S_{NN(k,x_j)}(t_j)]|k=1,\ldots,K) \quad (7.)$$

is optimized, where the notation indicates that P may depend (in some as yet unspecified manner) on the particular survival or failure probabilities. This dependence is a feature of the particular problem and is determined according to a logical model for the occurrence of the particular failure categories. A preferred class of objective functions of the form (7.) may be regarded as statistical likelihood functions, where for the embodiment $$L(\mu; \{x_j, t_j, \delta_{jk}\}) = \prod_{j=1}^{n}\prod_{k=1}^{K} [f_{NN(k,x_j)}(t_j)]^{\varepsilon_{jk}} [S_{NN(k,x_j)}(t_j)]^{\psi_{jk}}. \quad (8.)$$

is chosen. The two arguments $f_{NN(k,x)}$ and $S_{NN(k,x)}$ are determined uniquely under the assumption that the neural net or other learning capable model provides the appropriate output node values. This assumption is always satisfied in the embodiment.

Here, $\epsilon_{jk}$ and $\psi_{jk}$ are determined from $\delta_{jk}$ according to the defined logical relationship of the failure categories where $\delta_{jk}=1$ if patient j suffers failure of category k at time $t_j$ and otherwise $\delta_{jk}=0$. Censored data patterns correspond to those patients for which observation ends before any failure is recorded, so that $\delta_{jk}=0$ for all k=1,2,3, . . . . The functional dependence of the objective function on the model is denoted symbolically by the variable parameters μ. An example for determination of $\epsilon_{jk}$ and $\psi_{jk}$ is given in what follows.

In the embodiment, the parameters denoted μ are the baseline hazard constants $\lambda_{0k}$ and the weights of the neural network. The index j denotes the particular patient data pattern.

In the embodiment, the time integration required to solve Equation 6 for $S_k$ is computed by the standard method of Romberg integration. This method allows arbitrary time dependence of the functions $B_i(t)$ to be taken into account.

At the time t, let S(t) be the expectation value of the fraction of patients having experienced no failure of any of the categories k=1, . . . , K. In the embodiment, this quantity is given by the product of the individual probabilities:

$$S(t) = \prod_{k=1}^{K} S_k(t). \tag{9.}$$

Specification of the embodiment for an Example

For a complete specification of the embodiment, the quantities $\psi_{jk}$ and $\epsilon_{jk}$ now need to be determined. In what follows, these functions are completely specified as an illustration for two cases of the invention embodiment that are typical for the application of the invention in the context of competing risks.

Figure 2:
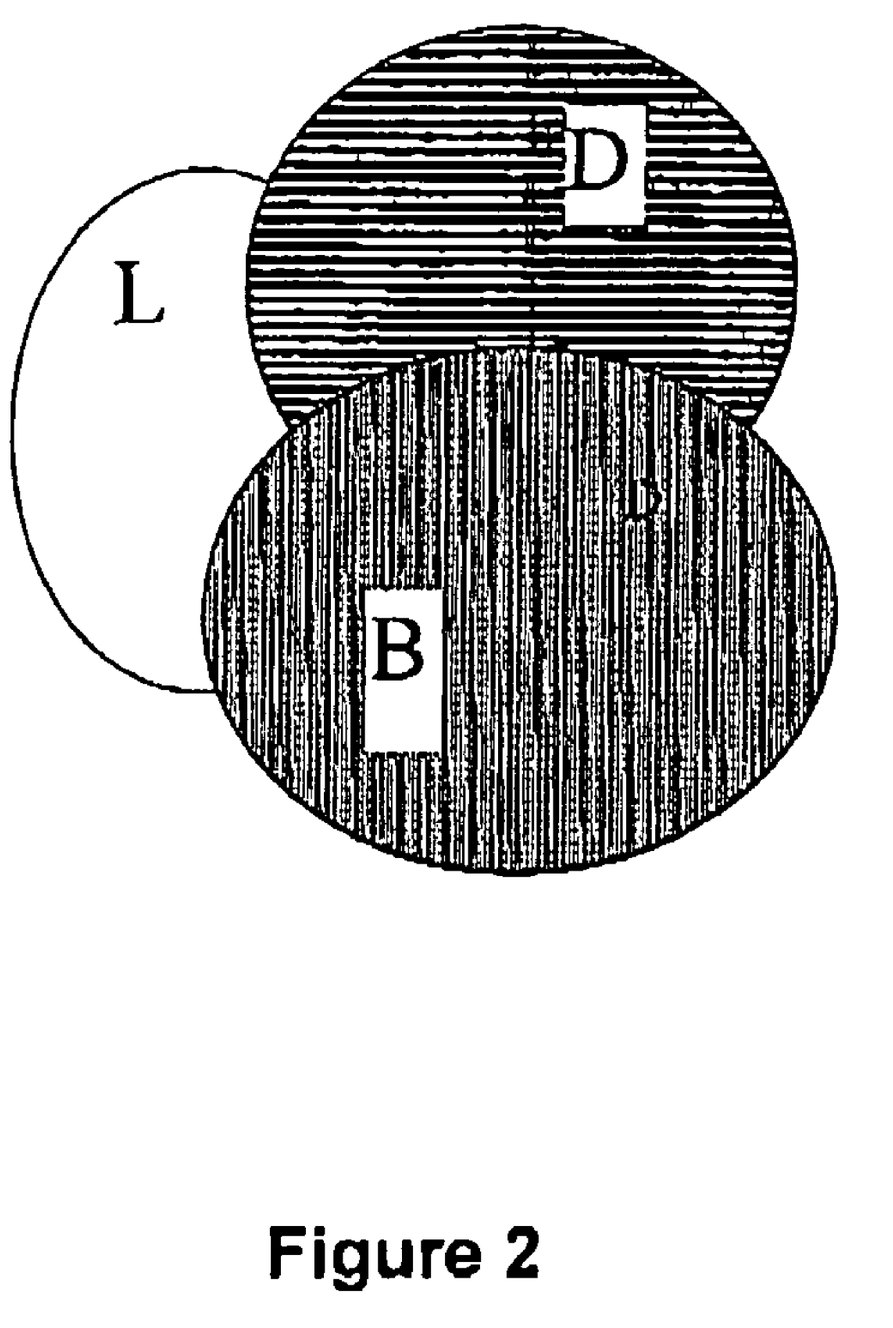

Consider a disease with three failure categories. The patient followed-up is at month t (t=1, 2, . . . ). At month t, it can happen that either some combination of the three failures or no failure at all is observed, in which case the patient is said to be "censored." The situation is illustrated as a Venn diagram in FIG. 2.

In the case of the disease breast cancer, the three failure categories could be bone metastasis (B for "bone", k=1), other distant metastasis, (D for "distant", k=2), and loco-regional (L for "local", k=3). At month t, occurrence of all three failure categories or any combination thereof is possible. However, for clinical, pharmacological, or data processing considerations, the follow-up at month t could be coded according to the following logic:

--- bone metastasis (present/absent)?
   If present, then $\epsilon_{j1} = 1$ $\epsilon_{j2} = 0$ $\epsilon_{j3} = 0$ $\Psi_{j1} = 0$ $\Psi_{j2} = 0$ $\Psi_{j3} = 0$
   If absent, other distant metastasis (present/absent)?
     If present, then $\epsilon_{j1} = 0$ $\epsilon_{j2} = 1$ $\epsilon_{j3} = 0$ $\Psi_{j1} = 1$ $\Psi_{j2} = 0$ $\Psi_{j3} = 0$
     If absent, then loco-regional (present/absent)
        If present, then $\epsilon_{j1} = 0$ $\epsilon_{j2} = 0$ $\epsilon_{j3} = 1$ $\Psi_{j1} = 1$ $\Psi_{j2} = 1$ $\Psi_{j3} = 0$
        If absent, then $\epsilon_{j1} = 0$ $\epsilon_{j2} = 0$ $\epsilon_{j3} = 0$ $\Psi_{j1} = 1$ $\Psi_{j2} = 1$ $\Psi_{j3} = 1$

---

In other words:

In this coding of $\epsilon_{jk}$ and $\psi_{jk}$, the occurrence of bone metastasis is assigned highest priority, i.e., if bone metastasis is present, then it is not recorded whether or not the other failure categories occurred by time t. Hence, according to this logic, for the observation "bone metastasis present", the contribution of patient j to the likelihood function (8) is evidently given by the term $f_{NN(1j)}$ (no term with $S_{NN(kj)}$.)

If the observation is "bone metastasis absent, but other distant metastasis present ", then this coding implies a contribution $f_{NN(2j)} \times S_{NN(1j)}$ to the likelihood function.

If the observation is "bone and other distant metastasis absent, but loco-regional metastasis present", then this coding implies a contribution $f_{NN(3j)} \times S_{NN(1j)} \times S_{NN(2j)}$.

If the observation is censored, the coding implies a contribution $S_{NN(1j)} \times S_{NN(2j)} \times S_{NN(3j)}$ to the likelihood function.

The invention is also applicable to measurements in which presence/absence of each of a set of multiple failure categories at time t is always coded and taken into account, provided that the above equations are replaced by appropriate equations for the probability of observed combinations of failure types, given estimates of the separate failure category probabilities.

Structure of a Neural Net for Determination of Competing Risks

Figure 3:
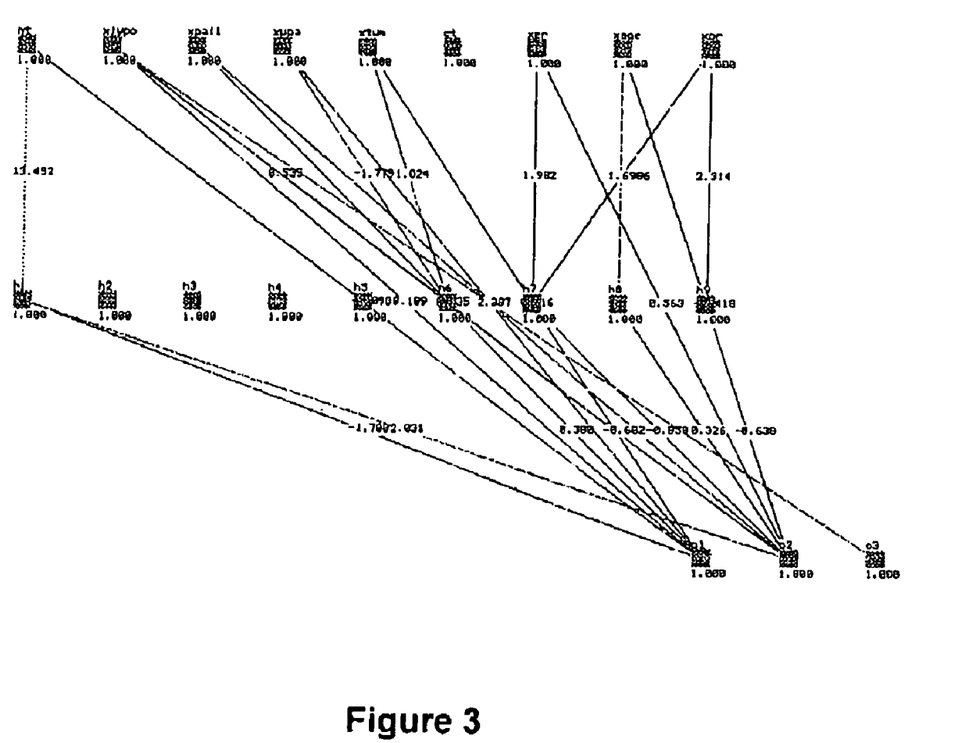

FIG. 3 shows the structure of a neural net of architecture MLP. In this case, the neural net comprises
   an input layer with a number $N_i$ of input neurons
   at least one internal or hidden layer with $N_h$ h hidden neurons
   an output layer with a number $N_o$ output neurons
   a number of directed connectors each connecting two neurons of different layers.

In the embodiment according to FIG. 3, a two-dimensional output layer is depicted in order to illustrate the capability of the invention to represent competing risks that are also time-varying. The representation is simplified for the special case of competing risks that are not time-varying, i.e., only the dimension of the failure categories is required.

The number $N_i$ of input neurons initially activated usually corresponds to the number of objective factors available for the patient collective. Procedures for either reducing the number of input neurons at the outset to a number acceptable for the computational resources or for eliminating superfluous neurons during the course of optimization are available according to the prior art, so that in either case determination of the neurons actually utilized is made automatically, i.e., without any intervention of the individual operating the system.

In the embodiment according to FIG. 3, the original number of hidden nodes is determined by the original number of input neurons, i.e., $$N_h = N_i \tag{10.a}$$

In this case there exist procedures according to the prior art enabling a favorable initialization of connector weights.

In the embodiment according to FIG. 3, the output layer neurons are organized schematically in a two-dimensional matrix with indices $$J_{time}=1 \ldots, N_{time} \tag{10.b}$$

$$J_{key}=1, \ldots, N_{key} \tag{10.c}$$

where the number of originally active neurons of the output layer is given by $$N_o = N_{time} \times N_{key} \tag{10.d}$$

Here, the index $J_{key}$ denotes the category of the signal, while the index $J_{time}$ refers to the signal corresponding to the "$J_{time}$-th" time function (e.g., fractional polynomials or spline functions). Accordingly, an output neuron indexed by the two indices $J_{time}$, $J_{key}$ contributes to the determination of the coefficient of the time function signal of index $J_{time}$ for the risk of category $J_{key}$. In the embodiment, the indices $J_{key}$ and $J_{time}$ correspond schematically to the indices k and l, respectively, of Equations 4 to 7. The quantities $N_{key}$ and $N_{time}$ of the embodiment correspond analogously to the quantities K and L, respectively, of these equations.

For application of the invention to the case of recursive partitioning, note that are also end nodes (also known as "leaves" of the regression "tree"), which usually (i.e., for only one risk) are numbered as a one-dimensional sequence. According to the prior art, each patient is assigned to one such node. According to the prior art, a node corresponds to a risk that may be regarded as a (scalar) signal. In contrast, instead of a scalar, the invention assigns to each end node a vector with $N_{key}$ indices.

Training

For the embodiment, the purpose of learning (training) is to locate the position in parameter space with a value of the likelihood function that is as high as possible while avoiding superfluous parameters if possible. In the embodiment, training is performed by initialization, optimization steps, and complexity reduction as follows:

Initialization

Univariate Analysis

Before the entire network with all weights is trained, it is advantageous to carry out a univariate analysis for each factor. This analysis has several applications:

The univariate impact of the factors on a risk k or, put another way, their individual prognostic performance is available as a reference for comparison with the complete network.

Univariate analysis is of practical use in determining a ranking of factors for the case in which there are fewer input nodes than factors.

Univariate analysis provides a basis for initialization of weights favoring, or at least not suppressing, nonlinear configurations (see below).

In the embodiment, an exponential survival model is constructed with the single parameter consisting of the baseline hazard constant $\lambda_0$. This model is used for initialization and also serves as a reference in the subsequent analysis.

Linear Univariate Models

The value of the j-th factor $X_j$ transformed according to Eq. (1a) is regarded as the single input node in a "network" consisting of exactly one linear connector (i.e., no hidden nodes) from this input neuron to an output neuron k. The time variation of this output node corresponds to the "proportional hazards model" for censored data. The resulting model has only two free parameters: the baseline hazard constant ($\lambda_0$) and the weight associated with the connector. These are optimized for risk k and their values stored in a table for subsequent reference, together with the performance (likelihood) and the statistical significance.

Nonlinear Univariate Models

Next, for each factor, a four-parameter nonlinear univariate model is optimized. Here, the value $X_j$ resulting from the transformation of the j-th factor is considered as the "input neuron." The univariate network now consists of this one input neuron, one single hidden neuron, and one output neuron (without a linear connector between input and output neuron). The time-variation of this output node corresponds to a "proportional hazards model" (K=1) for censored data.

The four parameters correspond respectively to the baseline hazard constant ($\lambda_0$), the weight and bias to the hidden neuron; and the weight of the connector to the output layer. These values are optimized and stored in a table for subsequent use together with the performance (likelihood) and significance.

Input Variable Ranking

After the univariate models have been determined for each factor, the factors significant in univariate analysis are ranked according to the absolute values of their linear weights. The numbering of input nodes for the subsequent full analysis corresponds to this ranking. If fewer input nodes than factors are available, this procedure allows an objective pre-selection of the "most important" factors.

Initialization of Weights

For net optimization (training), it is necessary to set initial values of the weights. Setting weights to exactly zero is unsatisfactory. In the embodiment, the weights of the linear connectors are initialized to random small values in the usual way. The baseline hazard constant is initialized to the value $\lambda_0$ determined from the 1-parameter model. The number H of hidden nodes is taken equal to the number J of input nodes. The connector from the input neuron j to the hidden neuron with the same index h=j is now initialized to the weight determined from the "nonlinear univariate model" described above. The associated bias is initialized analogously to the corresponding bias of the nonlinear univariate model. These two quantities are then shifted by a small random amount. Hence, by construction, the output of each hidden node corresponds approximately to an optimized nonlinear value.

For each hidden node h, the value of the weight obtained by the aforementioned univariate optimization, denoted here as $w_{h1}$, to the first neuron of the output layer is also available. Now, in order to initialize the weights to the output layer, the quantities $w_{h1}$, h=1, . . . , H are weighted by H random numbers: In the embodiment a random partition of unity is generated by first sampling H random numbers from a uniform distribution [0,1] and then dividing by their sum; i.e., the resulting numbers sum to 1. These and all other connectors (i.e., weights from the hidden layer to neurons of the output layer with k=2, etc.) are shifted by a small random amount.

An alternative procedure that commonly used in the prior art for initialization of neural net training consists of assigning small random weights to all connectors. This procedure results in an initial configuration in which all connectors, including those leading into the hidden layer, ar in the linear regim i.e., for small arguments, the "activation function" is nearly linear; for example $\tanh(x) \approx x$ for small values of x.

Linear Statistics of the Input Factors

In the embodiment, the covariance matrix of all input factors is computed and saved; a linear regression of each factor on all the others—i.e., $X_2 \approx A X_1 + B$—is also computed and saved; Eigenvectors and eigenvalues of the covariance matrix are also computed and saved; all these computations are written to a protocol. Moreover these linear relationships are used for various pruning procedures in the embodiment.

Assignment of Patient Data to Training and Validation Sets

For a learning capable system, it is common to split the set of available patterns by random selection into training, validation, and generalization sets. In the embodiment, the user can specify percentages (including zero) of the entire pattern set to be reserved for validation and generalization, respectively. The generalization set is not taken into account for training at all, in order to enable a completely unbiased subsequent test of performance on these patterns. The performance on the validation set, if present is tested repeatedly in the course of optimization: The performance on the validation set provides an independent measure of the progress of optimization, which is based otherwise on the training set performance alone, and testing this additionally serves to avoid over-training.

Selection of Factors

In the embodiment, there is an option to restrict consideration to a pre-specified subset of factors; for example in order to obtain models for applicable to future patterns in which only this factor subset is available.

Net Optimization

Simplex Optimization

Optimization involves a search for a maximum of the likelihood function with respect to the data of the training set. The parameter space for the search consists of the n-K net weights that are still active together with the global baseline hazard constants $\lambda_{k0}$, k=1, ..., K. This requirement results in an n-dimensional search space.

The search method implemented in the embodiment utilizes the construction of an n-dimensional simplex in this space according to the method of Nelder and Mead (1965), known from the prior art. The search requires the construction of an n-dimensional simplex in parameter space. A simplex is uniquely determined by specification of n+1 non-degenerate vertices, i.e., the corresponding edges are all mutually linearly independent. A simplex thus bounds an n-dimensional point-set in parameter space. The optimization search is conducted in iteration steps known as "epochs". During each epoch, the performance on the training set is computed by evaluation of the objective function at several "locations" in parameter space, that is, at the current reference vertex position land at n additional vertices, which are determined by composition of mathematical operations such as reflection, expansion/contraction in a direction, etc. The directions in parameter space associated with these operations are automatically determined based on the characteristic performance value on the vertices of the preceding epoch, and a new reference vertex is determined. In the embodiment, the performance at the reference vertex is a monotonic function (up to machine accuracy), and the search terminates at a point that is at least a local minimum (i.e., of the negative of the function to be maximized).

Utilization of the Validation Set

If present, the aforementioned validation set serves as a check of the progress of optimization and avoidance of over-training.

In the embodiment, the negative log-likelihood per pattern on the training and validation sets, respectively, are continually computed and archived as characteristic measures of the performance on these two sets at the current optimization epoch. Although this characteristic decreases monotonically on the training set as a consequence of the simplex method, temporary fluctuations of the corresponding characteristic can occur on the validation set even if over-training has not yet occurred. However, if steady increase of the characteristic on the validation set occurs, it is advantageous to trigger the stopping of further optimization (training) followed by a round of complexity reduction. This form of stopping criterion represents a kind of "emergency brake" for avoidance of over-training.

The embodiment provides for an automatic stopping criterion by defining and monitoring at each epoch an exponentially smoothed performance characteristic on the validation set. If this smoothed characteristic exceeds the previously attained minimum (i.e. if the performance worsens) by a pre-specified percentage, the optimization is automatically stopped. Tolerance of a percentage increase of 1% has been determined for a typical size of the training set of about 300 or more data patterns. For this tolerance, assuming that training and validation sets are about the same size, the stopping condition for training is more often triggered by attainment of an absolute minimum on the training set than by the worsening of the performance on the validation set. This "normal" stopping criterion is preferred because an (almost) monotonic improvement of performance on the validation set is an indicator that the neural network has recognized true underlying structures, rather than merely random noise.

No validation set is used in the example of the embodiment. In this case, the slopping criterion is just the attainment of a minimum on the training set.

Structure Optimization and Complexity Reduction

The result of the simplex optimization described for the embodiment is a set of weights $\{w_{[1]}, \ldots, w_{[n]}\}$ and other parameters determining a local minimum of the negative log likelihood. (The numbering [1]...[n] of the weights need not corresponds to their topological ordering.) This minimum refers to the particular set of n fixed weights in their particular topology. Now, in order to avoid over-fitting, it is desirable to reduce the complexity by pruning weights, as long as this pruning does not result in a significant loss of performance.

Pruning denotes the deactivation of connectors. To this end, the weights of said deactivated connectors are "frozen" to a fixed value (in the embodiment, the fixed value is zero, so that one may also speak of "removing" weights). It is possible in principle to remove individual weights or even entire nodes. In the latter case, all weights leading to or from the node to be pruned are deactivated.

In the embodiment, a phase of complexity reduction is carried out in the network immediately following an optimization phase (simplex procedure). The first step of this complexity reduction phase is "pruning" of individual connectors. Next, combinations of different connectors are tested for redundancy. Finally, the consistency of the topology is checked, and those connectors and/or nodes are removed that, due to prior removal of other connectors and nodes, no longer contribute to the output. This procedure is not the subject of the invention, but represents good practice according to the state of the art.

In the embodiment, various statistical hypotheses are automatically constructed for complexity reduction, which are tested by means of a likelihood ratio test with respect to a pre-specified significance level. Certain weights and parameters are considered to be mandatory, i.e., they are not subject to removal. In the embodiment, these include the global baseline hazard constants $\lambda_{0k}$.

Connector Ranking

In order to determine the order in which to test the connectors, a test statistic log(likelihood ratio) is constructed in the embodiment. Here, for each weight $w_{[4]}$, one considers two networks:

The net with all current weights (n degrees of freedom), including $w_{[4]}$.
The net with all current weights except for $w_{[4]}$, which is deactivated (n-1 degrees of freedom).

In the net with $W_{[4]}$ deactivated, the remaining weights are considered to be fixed at their current optimized values.

Testing

In the embodiment, after a ranking $\{w_{[1]}, \ldots w_{[n]}\}$ of the, weights according to the "likelihood ratio" has been recorded, the weights are tested in this order for pruning, until a specified maximum of $G_{max}$ weights have been chosen for removal.

Denoting by A-1 the number of weights already removed, two hypotheses are tested to determine whether an additional A-th weight $w_{[A]}$ is to be removed.

Test statistic for the hypothesis $H_{A-1}$: Likelihood ratio for net with weights $\{w_{[1]}, \ldots w_{[A-1]}\}$ deactivated (n-A+1 degrees of freedom)

Test statistic for the hypothesis $H_A$: Likelihood ratio for net with weights $\{w_{[1]}, \ldots w_{[A]}\}$ deactivated (n-A degrees of freedom)

The hypothesis HA is now tested twice:

$H_A$ versus $H_{A-1}$ and $H_A$ versus H.

The significance of $w_{[A]}$ is tested by application of a chi-squared test with respect to the likelihood ratio. If $H_A$ is accepted in either of the comparisons (pruning A leads to significantly worse fit), then the connector A is retained, and the pruning step is terminated.

In deactivation, the connector is removed from the list of active connectors and its corresponding weight is frozen (usually to zero).

In the embodiment, the number G of connectors removed during a pruning phase is limited to a maximum of $G_{max}=n/10$, where n is the number of remaining connectors.

Further Complexity Reduction

In the embodiment, further connectors are removed by pairwise analysis of weights and their relationship to the likelihood of the data, taking into account various correlation properties. However, this step is by no means compulsory for the function of a learning capable model and can be omitted. Alternative embodiments of the invention can be combined with alternative or additional techniques of complexity reduction that may be already implemented in various learning capable systems.

Topology Check

Pruning or removal of individual connectors can result in isolation of a node either from all input signals, all output signals, or (in the case of a hidden neuron) from both. In any of these cases a deactivation flag is set in the embodiment for the node in question. For output layer neurons, "isolation" means that there are no active connectors into the node: neither from the input layer, nor from the hidden layer. If all connectors from an input neuron to the hidden and output layers have been removed, then the bias of the linear connectors is also deactivated.

A hidden neuron that has been isolated from all inputs can still be connected to outputs. However, the "frozen" contribution of such hidden neurons to the output are redundant because there only effect is to modify the bias values of the remaining active connectors. Hence, such neurons are deactivated, and any remaining connectors to the output layer are removed.

These various checks can themselves lead to isolation of further nodes. For this reason, the procedure is iterated until the topology remains constant.

Termination of Training and Output

In the embodiment of the invention, if no further complexity reduction is possible following the last simplex optimization, training is terminated. The final values of all weights and other parameters are set to their final values, and these values are archived in files created for this purpose.

Thus, the trained neural network is uniquely determined. By reading in these archived values of weights and other parameters (either immediately or at any later time), the trained neural net can be used according to the above description to reconstruct, for arbitrary data containing values of the independent variables ("covariates") x, the output scores and thus the previously defined functions $f_k(f)$, $\lambda_k(f)$, and $\lambda_k(f)$, associated with these covariates x. With these functions, the probability model is determined.

In particular, it is of course possible to compute the dependence of the form of said functions on the values of selected factors. A computation of this dependence is useful in order to evaluate the expected effect of a therapy concept, if the therapies to be evaluated were used as "factors" in training the learning capable system.

EXAMPLE

Data

In order to illustrate the operation of the invention in the embodiment, 1000 synthetic patient data patterns were first generated containing 9 explanatory factors (covariates) by means of a random sample generator. The first seven of these factors were sampled as realizations of a multivariate normal distribution. The means and variances for the example were specified thus:

| Faktor | xlypo | xer | xpr | xage | xtum | xupa | xpai |
|---|---|---|---|---|---|---|---|
| Mittelwert | 0.50 | 0.45 | 0.45 | 0.50 | 0.51 | 0.50 | 0.50 |
| Varianz | 0.071 | 0.087 | 0.097 | 0.083 | 0.083 | 0.084 | 0.083 |

The assumed covariance matrix was

|  | xlypo | xer | xpr | xage | xtum | xupa | xpai |
|---|---|---|---|---|---|---|---|
| xlypo | 1.00 | −0.06 | −0.09 | 0.03 | 0.42 | 0.02 | 0.05 |
| xer | −0.06 | 1.00 | 0.54 | 0.29 | −0.07 | −0.18 | −0.19 |
| xpr | −0.09 | 0.54 | 1.00 | 0.03 | −0.06 | −0.07 | −0.14 |
| xage | 0.03 | 0.29 | 0.03 | 1.00 | 0.04 | 0.02 | 0.00 |
| xtum | 0.42 | −0.07 | −0.06 | 0.04 | 1.00 | 0.03 | 0.06 |
| xupa | 0.02 | −0.18 | −0.07 | 0.02 | 0.03 | 1.00 | 0.54 |
| xpai | 0.05 | −0.19 | −0.14 | 0.00 | 0.06 | 0.54 | 1.00 |

In order to represent as realistic a situation as possible, these values were chosen to be of the same order of magnitude as values known from the scientific literature for certain factors used in the case of breast cancer. However, for the function of the invention, the precise values assumed as well as the interpretation of the factors are completely immaterial.

In addition to the seven aforementioned factors, two further binary factors ("therapies") denoted "ct" and "ht" were randomly generated. For ht, 50% of the patients were randomly assigned value 1 and 0, respectively. In the example, only 1% of the patients were assigned ct=1, the rest zero. Hence, it is to be expected that ct would not be detected as a significant factor by the neural net.

The first ten resulting patterns are as illustrated:

| Patient Number | xlypo | xer | xpr | xage | xtum | xupa | xpai | ct | ht |
|---|---|---|---|---|---|---|---|---|---|
| 1 | 0.07 | 0.89 | 1.41 | 0.36 | 0.49 | 0.31 | 0.22 | 0 | 1 |
| 2 | 0.25 | 0.23 | 0.98 | 0.15 | 0.10 | 0.31 | 0.05 | 0 | 0 |
| 3 | 0.56 | 0.52 | 0.79 | 0.09 | 0.22 | −0.22 | −0.07 | 0 | 1 |
| 4 | 0.61 | 0.83 | 1.10 | 0.73 | 0.56 | 0.21 | 0.44 | 0 | 1 |
| 5 | 0.97 | 0.38 | 0.70 | 0.61 | 0.51 | 0.97 | 0.72 | 0 | 0 |
| 6 | 0.44 | 0.22 | 0.07 | 0.90 | 0.80 | 0.60 | 0.55 | 0 | 1 |
| 7 | 0.46 | 0.24 | 0.47 | 0.14 | 0.60 | 0.57 | 0.31 | 0 | 0 |

-continued

| Patient Number | xlypo | xer | xpr | xage | xtum | xupa | xpai | ct | ht |
|---|---|---|---|---|---|---|---|---|---|
| 8 | 0.42 | 0.60 | 0.41 | 0.38 | 0.54 | 0.23 | 0.47 | 0 | 0 |
| 9 | −0.01 | 0.22 | 0.80 | 0.52 | 0.38 | −0.13 | 0.41 | 0 | 0 |
| 10 | 0.80 | 0.41 | 0.19 | 0.11 | 0.45 | 0.40 | 0.51 | 0 | 0 |

For the influence of the factors on disease course, three independent risk hazards denoted risk(i), i=1,3 were first generated. The following model was assumed:

$\text{risk}(1) = \exp(r_1 + r_2 + r_3 + r_4 - r_h)$ $\text{risk}(2) = \exp(r_1 + r_3 + r_4)$ $\text{risk}(3) = \exp(r_1)$ with $r_1 = 2(\text{xlypo} - \text{median}(\text{xlypo}))$
$r_2 = 0,5(\text{xtum} - \text{median}(\text{xtum}))$
$r_3 = 0,75(\text{xupa} - \text{median}(\text{xupa}))$
$r_4 = 1,5(\text{xpal} - \text{median}(\text{paimed}))$ and
$r_h = 1$ if ht=1.

Using these risk values, true failure times of the three risk categories were generated by random sampling from exponential distributions or modified exponential distributions with a base time constant of 200 months. It was additionally assumed that if failures of the $3^{rd}$ category do occur, then at the latest by the $24^{th}$ month, in order to simulate a situation with competing risks analogous to loco-regional relapse in breast cancer. These data were censored according to a simulated "study", and an "observation" was simulated according the priority scheme of FIG. 1.

If follows from the model assumed in the example that for the third failure category, only the factor "xlypo" has a causal effect Nonetheless, there is an indirect relationship between the remaining factors and the observation of failures of the third failure category, because an increased risk of the other failure categories resulting from other factors can reduce the probability of observing a failure of the third category. Although this characteristic of the assumed model is immaterial for the function of the invention, it illustrates a potential benefit.

Trained Neural Net

The neurons of the output layer are arranged according to Equations 4 to 7 and 10 with $N_{time}=1$ and $N_{key}=3$, so that 3 neurons of the output layer are initially active. For the example, 9 input neurons and an equal number of hidden neurons are initially activated. The neural net trained according to the methods described above is illustrated in FIG. 3 ("xpai" and "xpai1" are identical). Note that only one connector leads to the output node "O3", which originates from the node (neuron) "xlypo". Here, the outputs O1 to O3 correspond to the risks "risk(1)" to "risk(3)", respectively.

A complete and unique representation of the trained neural net is determined by specifying the remaining connectors with their corresponding weights and biases as well as the baseline hazard constants. To demonstrate this, Table 2a lists each neuron that receives an active connector (target neuron, "tgt") and all sources ("src") with their corresponding weights ("wt"). Note that many of the original connectors are inactive.

TABLE 2a

| tgt | src | wt | src | wt | src | wt | src | wt | src | wt | src | wt | src | wt | src | wt |
|---|---|---|---|---|---|---|---|---|---|---|---|---|---|---|---|---|
| h1 | ht | 13.5 | | | | | | | | | | | | | | |
| h6 | xlypo | 0.53 | xupa | −1.78 | xtum | 1.02 | | | | | | | | | | |
| h7 | xer | 1.98 | xpr | −1.37 | | | | | | | | | | | | |
| h8 | xage | 1.70 | | | | | | | | | | | | | | |
| h9 | xpr | 2.31 | | | | | | | | | | | | | | |
| o1 | h1 | −1.70 | h6 | 0.30 | ht | −1.10 | xlypo | 0.19 | xpai | 0.72 | xupa | 0.83 | xtum | 0.22 | | |
| o2 | h1 | 2.03 | h6 | −0.66 | h7 | −0.86 | h8 | 0.33 | h9 | −0.64 | xlpo | 0.64 | xpai1 | 0.91 | xer | 0.56 | xage | −0.42 |
| o3 | xlypo | 2.39 | | | | | | | | | | | | | | |

The biases are given in Table 2b:

TABLE 2b

Bias values (automatically 0 for inactive neurons)

| ht | xlypo | xpai | xupa | xtum | ct | xer | xage | xpr | h1 | h2 | h3 | h4 | h5 | h6 | h7 | h8 | h9 | o1 | o2 | o3 |
|---|---|---|---|---|---|---|---|---|---|---|---|---|---|---|---|---|---|---|---|---|
| 0.17 | 0.16 | 0 | 0 | 0 | 0 | 0 | 0 | 0 | −0.94 | 0 | 0 | 0 | 0 | 0.66 | 1.31 | 0 | 2.07 | 1.03 | 0.66 | −0.11 |

Finally, the values of the baseline hazard constants $\lambda_{0k}$ required for specification of the model of Equation 6 may be read off from Table 2c (the units of these constants correspond to the aforementioned time constant of 200 months):

TABLE 2c

| $\lambda_{01}$ | $\lambda_{02}$ | $\lambda_{03}$ |
|---|---|---|
| 0.53/200 | 0.13/200 | 0.27/200 |

Time-Varying Hazards

Output neurons for time-varying hazards could be included by replacing the parameter $N_{time}=1$ as used here by a higher value of $N_{time}$. The number of output neurons is then determined by Equation 10.d. For example, if $N_{key}=3$ and $N_{time}=2$, one would then have $N_0=6$. Training would proceed as described previously. If present, the separate time-varying hazards associated with the different risk categories could then be determined independently using the model of Equations 4 to 7, and in particular, the problem of determining competing risks would in no way be restricted.

We claim:

1. Method of determining a therapy decision regarding a medical patient based on a likelihood of outcomes considering potential post-therapy conditions, comprising:
   determining an objective function of a trained neural network based on patient events and observations for a general class of medical condition, wherein the previously-measured patient events and observations are objectifiable, and wherein the neural network includes
      an input layer having a plurality of input neurons that receive input data,
      at least one internal layer having a plurality of hidden neurons,
      an output layer having a plurality of output neurons that provide output signals, and
      a plurality of connectors, wherein each said connector interconnects two neurons of different layers, defining a sending direction from the input layer toward the output layer,
   recognizing an occurrence of a particular medical condition belonging to the general class of medical condition, as exhibited by the medical patient;
   providing an input to the trained neural network corresponding to the particular medical condition;
   combining a plurality of values generated by the trained neural network according to the objective function to produce one or more outputs;
   determining underlying probabilities of known potential post-therapy conditions of the particular medical condition based on the one or more outputs of the trained neural network; and
   determining the therapy decision for the medical patient based on the determined underlying probabilities;
   wherein the objective function L is expressed in terms of a function P:

$$L(\mu; \{x_j, t_j, \delta_{jk}\}) = \prod_{j=1}^{n} P([f_{LS(k,x_j)}(t_j)]; [S_{LS(k,x_j)}(t_j)]; k=1, \ldots, K)$$

where $\mu$ denotes the parameters of the trained neural network, $f_{LS(k,x_j)}(t_j)$ is a failure rate of category k, $S_{LS(k,x_j)}(t_j)$ is an expected proportion of medical patients j with observed factors $x_j$ not having experienced a failure of category k by time $t_j$, and P is determined from $\delta_{jk}$ by a logical relationship, wherein $\delta_{jk}=1$ if medical patient j has experienced failure of category k at time $t_j$ and otherwise $\delta_{jk}=0$; and wherein $$L(\mu; \{x_j, t_j, \delta_{jk}\}) = \prod_{j=1}^{n} \prod_{k=1}^{K} [f_{LS(k,x_j)}(t_j)]^{\epsilon_{jk}} [S_{LS(k,x_j)}(t_j)]^{\psi_{jk}}$$

is the objective function, where $\epsilon_{jk}$ and $\psi_{jk}$ are determined from $\delta_{jk}$ on the basis of logical relationships.

2. Method according to claim 1, further comprising applying therapy to the medical patient according to the therapy decision.

3. Method according to claim 1, further comprising using objectively-obtained data pertaining to the particular medical condition and to follow-up observation of the medical patient during a predetermined time period to modify the patient events and observations.

4. Method according to claim 3, further comprising applying the modified patient events and observations to the objective function.

5. Method according to claim 3, further comprising using a time of a last follow-up observation to modify the patient events and observations.

6. Method according to claim 1, further comprising basing the patient events and observations at least in part on observations of failure categories, wherein the failure categories are observed individually while other categories of events are excluded.

7. Method according to claim 1, wherein $$L(\mu; \{x_j, t_j, \delta_{jk}\}) = \prod_{j=1}^{n} \prod_{k=1}^{K} [f_{LS(k,x_j)}(t_j)]^{\delta_{jk}} [S_{LS(k,x_j)}(t_j)]^{1-\delta_{jk}}$$

is the objective function.

8. Method according to claim 1, further comprising carrying out recursive partitioning for a plurality medical patients by the neural network, including
   assigning each medical patient of the plurality of medical patients to a respective node of the neural network,
   assigning at least one of a frequency and a probability of each failure category of a set of predetermined failure categories to each said node, and
   statistically optimizing the objective function based at least in part on the at least one of a frequency and a probability.

9. Method according to claim 1, wherein the neural network is used in the framework of a decision support system.

10. Method according to claim 1, wherein values for the determination of the therapy decision are put in correspondence with different probability functions of the potential post-therapy conditions.

11. Method according to claim 1, wherein the patient events and observations are previously-measured.

* * * * *